US008400262B2

(12) United States Patent  
Sampei

(10) Patent No.: US 8,400,262 B2  
(45) Date of Patent: Mar. 19, 2013

(54) KEYLESS ENTRY DEVICE OF VEHICLE

(75) Inventor: Yoshio Sampei, Miyagi-Ken (JP)

(73) Assignee: Alps Electric Co., Ltd., Tokyo (JP)

(*) Notice: Subject to any disclaimer, the term of this patent is extended or adjusted under 35 U.S.C. 154(b) by 280 days.

(21) Appl. No.: 12/763,830

(22) Filed: Apr. 20, 2010

(65) Prior Publication Data  
US 2010/0271171 A1 Oct. 28, 2010

(30) Foreign Application Priority Data

Apr. 28, 2009 (JP) ................................. 2009-108721

(51) Int. Cl.  
G05B 19/00 (2006.01)
(52) U.S. Cl. .......................................................... 340/5.6
(58) Field of Classification Search .................. 340/5.6, 340/3.1, 10.1, 12.5  
See application file for complete search history.

(56) References Cited

U.S. PATENT DOCUMENTS 7,336,151 B2 * 2/2008 Ueda et al. .................... 340/5.72  
2007/0115096 A1 5/2007 Suzuki et al.  
2007/0216517 A1 9/2007 Kurpinski et al.

FOREIGN PATENT DOCUMENTS

| EP | 2 039 856 A1 | 3/2009 |
| EP | 2 246 226 A2 | 11/2010 |
| JP | 2008-121254 | 5/2008 |
| JP | 2008-190268 | 8/2008 |
| JP | 2008-196228 | 8/2008 |

OTHER PUBLICATIONS

Extended European Search Report issued in corresponding European Patent Application No. 10158160.1, mailed Dec. 16, 2010.

* cited by examiner

Primary Examiner — Vernal Brown  
(74) Attorney, Agent, or Firm — Brinks Hofer Gilson & Lione

(57) ABSTRACT

A keyless entry device of a vehicle includes: a transmission unit installed in the vehicle that transmits a search signal to a search range including an area inside the vehicle and a vicinity area outside the vehicle; a reply unit installed in a portable device carried by a user that transmits a reply signal when receiving the search signal at several locations within the search range; a determination unit that individually determines whether the portable device is present in the area inside the vehicle and the vicinity area outside the vehicle within the search range on the basis of the reply signal transmitted from the portable device; and a control unit that controls locking or unlocking of a door of the vehicle on the basis of the determination result of the determination unit.

5 Claims, 5 Drawing Sheets

FIG. 4A  FIG. 4B  FIG. 4C  FIG. 4D  FIG. 4E (A) [CONFIRM OUTSIDE OF VEHICLE] → NO / [CONFIRM INSIDE OF VEHICLE] → YES (B) [CONFIRM OUTSIDE OF VEHICLE] YES OR FAIL (C1) (C2) (C3) [CONFIRM OUTSIDE OF VEHICLE] YES (D1) (D2) (D3) [CONFIRM OUTSIDE OF VEHICLE] → NO / [CONFIRM INSIDE OF VEHICLE] → NO (E) [FACE OUTSIDE]

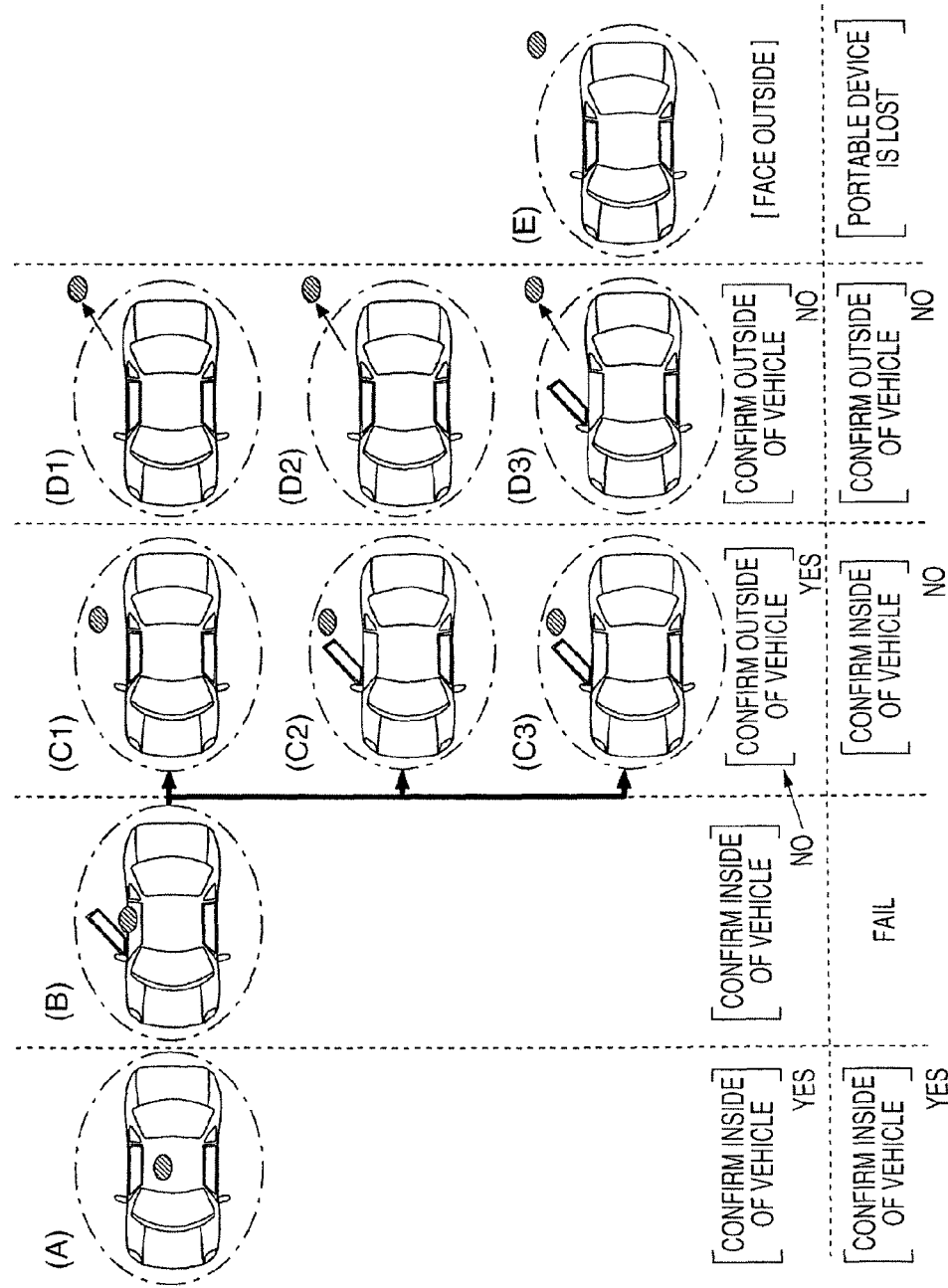

KEYLESS ENTRY DEVICE OF VEHICLE

CROSS REFERENCE TO RELATED APPLICATION

The present invention contains subject matter related to and claims priority to Japanese Patent Application JP 2009-108721 filed in the Japanese Patent Office on Apr. 28, 2009, the entire contents of which being incorporated herein by reference.

BACKGROUND

1. Technical Field

The present disclosure relates to a keyless entry device of a vehicle capable of carrying out radio communications between a portable device carried by a driver and the vehicle and performing locking or unlocking of a door without using a key.

2. Related Art

There is generally known a technique in a keyless entry device that automatically unlocks a door without a key operation by authenticating a corresponding one of plural antennas, which are installed in an in-vehicle device forming a search range of a portable device in a vicinity area outside a vehicle through radio waves, and the portable device through communication when unlocking of the door is requested (for example, see JP-A-2008-121254 (FIGS. 3 and 4).

In this known technique, when one door (for example, the door of a passenger's seat) is opened by the authentication in a certain search range, a detection range (for example, the vicinity of the door in the rear of the passenger's seat and the vicinity in the front of the passenger's seat) adjacent to the search range is continuously searched. When the detection range of detecting the portable device is changed, a detection range (for example, the vicinity of a backdoor, the vicinity of the door in the rear of a driver's seat, or the vicinity of the door of the driver' seat) adjacent to the detection range is continuously searched. Finally, when a detection range of the door of the driver's seat is reached without interruption of the search of the portable device, the door of the driver's seat is opened without a special operation.

In the known technique, the detection range of detecting the portable device and a detection range adjacent to the detection range continue to be searched after the unlocking of the door is performed. When the detecting of the portable device is stopped in all the detection ranges, the doors are all unlocked. For example, when a passenger carrying the portable device approaches and opens a door and when the passenger moves away from the vehicle later, the door can be unlocked automatically. This makes it convenient for the passenger and safety is increased.

When the portable device is not detected in any of the detection ranges in the vicinity of the vehicle, as in the known technique, a control method of locking the door is generally performed. In the known control method, however, the locking of the door is not generally performed when the portable device is detected inside the vehicle. The reason for performing this control is to prevent the door from being locked in a state where the portable device is present inside the vehicle (when a driver has forgotten to carry the portable device and has locked the door) and this control takes a priority over all conditions.

For this reason, when general control logic is designed to prevent the door from being locked, the control logic is performed in the following sequence. (1) It is confirmed whether a portable device is present inside a vehicle. When it is confirmed that the portable device is present, the search ends and locking of a door is not performed. (2) When it is confirmed that the portable device is not present, the search for the portable device is subsequently searched for in the vicinity outside the vehicle. When it is confirmed that the portable device is present, the portable device is continued in the vicinity outside the vehicle and the locking of the door is not performed. (3) Alternatively, when it is confirmed that the portable device is present in the vicinity outside the vehicle, the locking of the door is performed. According to this control logic, the locking of the door is not performed as long as it is confirmed that the portable device is present inside the vehicle. Therefore, it is expected that the portable device will not be locked inside erroneously.

In the control logic, however, when the driver carrying the portable device is getting off the vehicle and moving fast away from the vehicle, a chance of confirming the presence of the portable device may be missed at a time at which the portable device is present in the vicinity outside the vehicle for a certain time. That is, when the driver carrying the portable device is getting off the vehicle fast after the driving and is moving away from the vehicle at a speed exceeding a normal walking speed, the presence of the portable device cannot be confirmed in spite of first searching for the portable device inside the vehicle. This is because the driver has already gotten off the vehicle. Thereafter, when the portable device is searched for in the vicinity outside the vehicle, the presence of the portable device cannot be confirmed due to the fact that the driver carrying the portable device has already moved out of the detection range at this timing.

In effect, even when the driver carrying the portable device is away from the vehicle, the locking of the door may not be performed according to the control logic due to the fact that the portable device is not present anywhere. In this case, since the door of the vehicle is left unlocked according to the general control logic, the safety may not be ensured.

When the presence of the portable device cannot be confirmed in either the outside or the inside of the vehicle, it is not desirable to use a control logic in which the door is simply locked for reasons of the safety. This control logic has a problem in that the door is left unlocked in the state where the portable device is put inside the vehicle when communication with the portable device fails.

For example, it is supposed that the driver has gotten off the vehicle and moved away from the vehicle in the state where the portable device is put inside the vehicle. In this case, when radio interference or operation failure (deterioration in a battery capacity or the like) of the portable device occurs at timing at which the portable device is first searched for inside the vehicle, the presence of the portable device cannot be confirmed according to the control logic even in a case where the portable device is actually present inside the vehicle. Subsequently, the portable device is searched outside the vehicle. However, since the portable device has not been taken out to the outside of the vehicle, the presence of the portable device cannot be confirmed. In this case, the locking of the door is performed due to the priority of the safety according to the control logic. Therefore, the locking of the door may be performed carelessly in the state where the portable device is put inside the vehicle.

SUMMARY

According to an aspect of the disclosure, a keyless entry device of a vehicle includes: transmission means installed in the vehicle for transmitting a search signal to a search range including an area inside the vehicle and a vicinity area outside the vehicle; reply means installed in a portable device carried by a user for transmitting a reply signal when receiving the search signal at several locations within the search range; determination means for individually determining whether the portable device is present in the area inside the vehicle and the vicinity area outside the vehicle within the search range on the basis of the reply signal transmitted from the portable device; and control means for controlling locking or unlocking of a door of the vehicle on the basis of the determination result of the determination means.

In particular, upon controlling the locking of the door, the control means may change a status of the door from an unlocked status to a locked status under a condition that the determination means determines that the portable device is present in the vicinity area outside the vehicle at least once.

The determination means can individually determine whether the portable device is present inside the vehicle or the vicinity area outside the vehicle. However, in order for the control means to control the locking of the door, it is necessary to determine that the portable device is present in the vicinity area outside the vehicle at least once. Therefore, like the general control logic, by searching the inside of the vehicle first, it is determined that the portable device is not present, and then by searching the outside of the vehicle subsequently, it is determined that the portable device is not present. For this reason, the door is not locked carelessly. In this way, it is possible to reliably prevent the portable device from being left inside the vehicle due to the occurrence of the above-described radio interference or the communication failure.

When it is necessary to control the locking of the door, the determination is performed first in the outside of the vehicle due to the fact that it is necessary to determine that the portable device is present in the vicinity area outside the vehicle. For this reason, even when the portable device is not present in the vicinity area outside the vehicle at a particular time (moment) in the state where the driver carrying the portable device is getting off the vehicle and moving away from the vehicle, for example, there is a chance to determine the presence of the portable device at a midway timing and thus the locking of the door can be controlled after the condition has been reliably determined.

BRIEF DESCRIPTION OF THE DRAWINGS

FIG. 4 is a diagram conceptually illustrating status changes when a driver carrying the portable device is getting off the vehicle and walking away from the vehicle and determination results of a searching process performed during the status changes.

FIG. 5 is a diagram conceptually illustrating status changes and determination results of the searching process performed during the status changes according to a comparative example.

DESCRIPTION OF EXEMPLARY EMBODIMENTS

Figure 1:
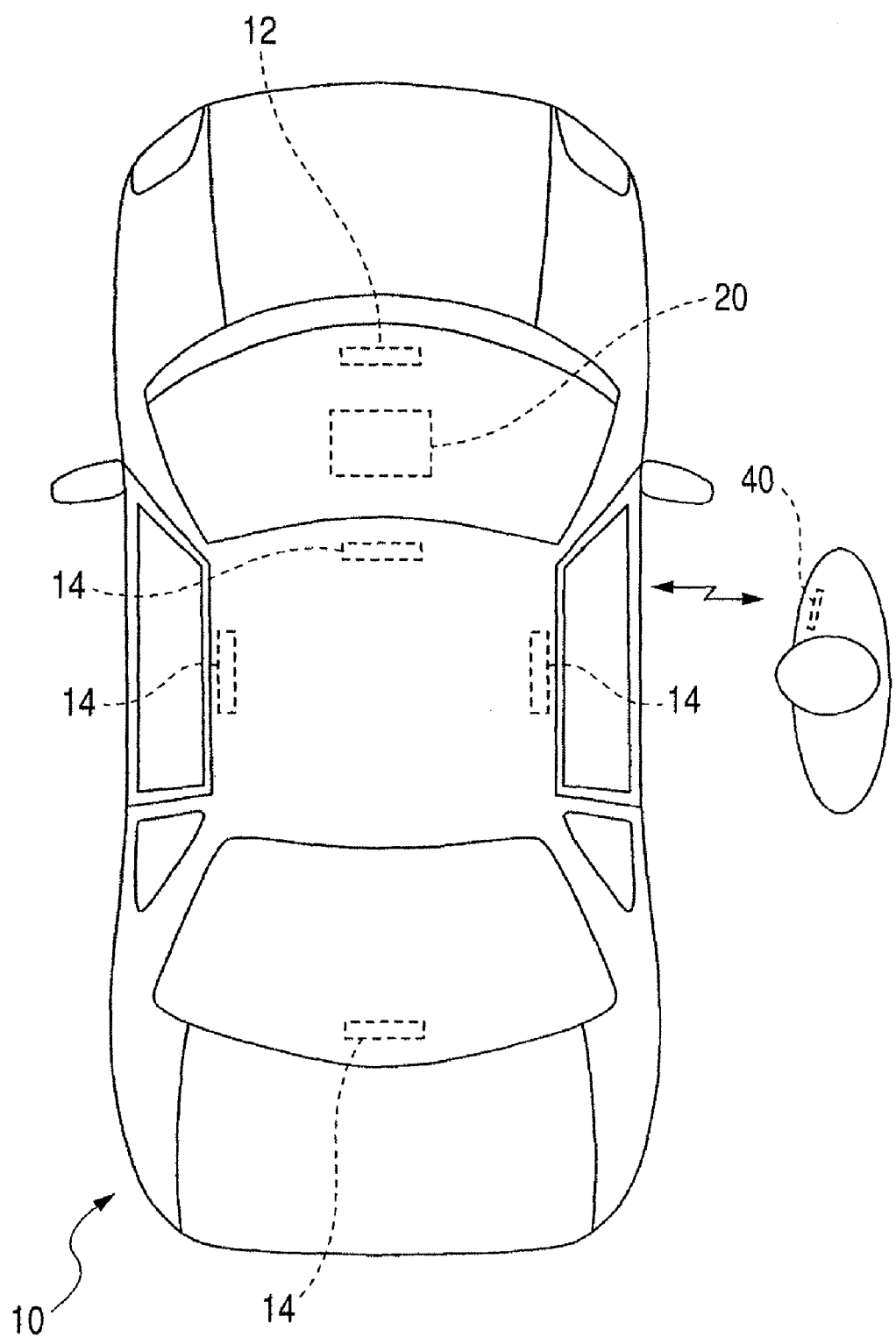
FIG. 1 is a diagram illustrating the overall configuration of a keyless entry device according to an embodiment.

Hereinafter, an embodiment of the invention will be described with reference to the drawings.
Overview of a Keyless Entry Device FIG. 1 is a diagram illustrating the overall configuration of a keyless entry device according to an embodiment. The keyless entry device is installed in a passenger type vehicle 10, for example. A receiving antenna 12 and a plurality of transmitting antennas 14 are installed in several locations of the vehicle 10. In this example, one receiving antenna 12 is installed in an instrument panel of the vehicle 10. One transmitting antenna 14 is installed in the front portion of a roof panel, one transmitting antenna 14 is installed in each of a driver's seat side and a passenger's seat side, and one transmitting antenna 14 is installed in a rear shelf tray (with no reference numeral in the drawing). That is, a total of four transmitting antennas are installed. In this case, the arrangement of the antennas 12 and 14 is just one example, and thus the antennas may be installed in other locations.

A control module (BCM (Body Control Module)) 20 is installed inside the vehicle 10. The receiving antenna 12 and the transmitting antennas 14 are connected to the control module 20 through wirings (not shown). Communication circuits (not shown) (which are described below as a receiving circuit 30 and a transmitting circuit 32) of the vehicle are included in the control module 20. The communication circuits have a function of carrying out radio communication with the portable device 40 carried by the user.

The keyless entry device has a function (so-called passive function) of carrying out the radio communication between the communication circuits of the vehicle and the portable device 40 and performing authentication using an ID (Identification) code or the like to lock or unlock doors automatically. The keyless entry device can permit an operation of a main switch without insertion of a key into a key cylinder, when the user (driver) carrying the portable device 40 gets in the vehicle. Since the function is a known function, detailed description thereof is omitted.

Figure 2:
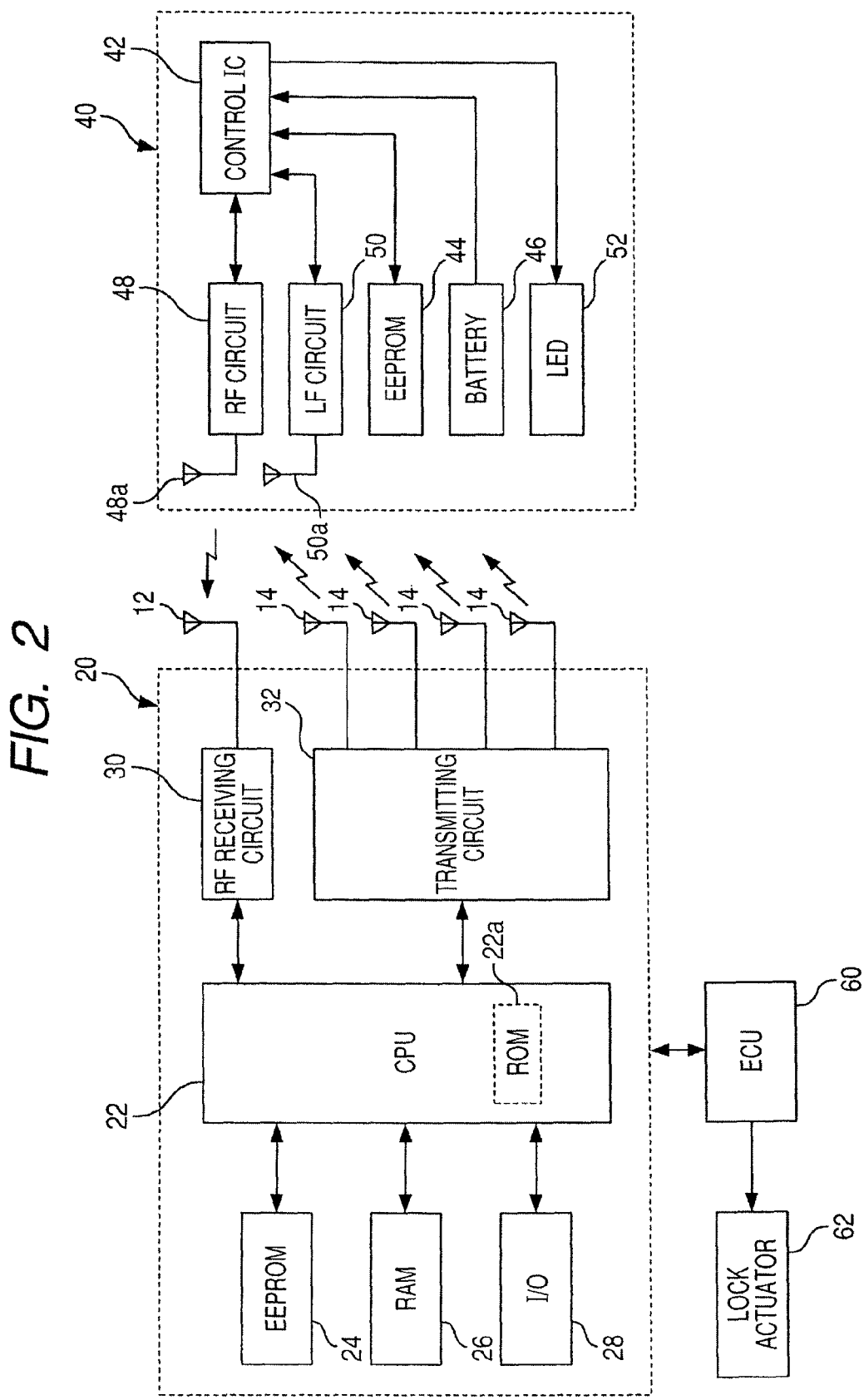
FIG. 2 is a block diagram schematically illustrating the electric configuration of the keyless entry device.

FIG. 2 is a block diagram schematically illustrating the electric configuration of the keyless entry device. Hereinafter, the constituent elements will be described.
Control Module The control module 20 is configured as a computer including a CPU (Central Processing Unit) 22, memory devices such as an EEPROM (Electronically Erasable and Programmable Read-Only Memory) 24 and a RAM (Random Access Memory) 26, and a peripheral IC (Integrated Circuit) such as an input/output (I/O) driver 28. The CPU 22 reads control programs stored in the internal ROM (Read-Only Memory) 22a and executes processes in accordance with the commands of the control programs.

A control program necessary for the operation of the keyless entry device is written in an internal ROM 22a of the CPU 22. Unique information such as the number of transmitting antennas 14 installed in the vehicle 10, the installation locations, and a unique ID code are written as unique parameters of the vehicle 10 in the EEPROM 24. For example, the RAM 26 is a volatile memory usable as the main memory of the CPU 22. The input/output driver 28 inputs and outputs various signals between the control module 20 and another electronic device.

The control module 20 includes a receiving circuit 30 and a transmitting circuit 32 as communication circuits for the vehicle. Since the receiving antenna 12 is connected to the receiving circuit 30, the receiving circuit 30 receives a reply signal (hereinafter, referred to as an answer signal") transmitted wirelessly from the portable device 40 via the receiving antenna 12. The receiving circuit 30 demodulates the ID code contained in the received RF signal, for example, to supply the value (with a word length of 1 to 2 bytes, for example) of the demodulated ID code to the CPU 22.

Transmitting Means

The above-described total four transmitting antennas 14 are connected to the transmitting circuit 32. The transmitting circuit 32 operates on the basis of an instruction of the CPU 22 and transmits a search signal (hereinafter, referred to as "a request signal") to the portable device 40 via the four transmitting antennas 14. In each transmitting antenna 14, for example, a universal type LF (Low Frequency) antenna can be used.

Portable Device

The portable device 40 is compact so that the user can comfortably carry the portable device 40. For example, a card type or key holder type portable device may be used. The portable device 40 includes a control IC 42, an EEPROM 44, a driving battery 46, an RF (Radio Frequency) circuit 48, and a transponder circuit 50. Since a control program is embedded in a storage area of the control IC 42, the control IC 42 controls the operation (mainly transmission and reception of the RF circuit 48 and the LF circuit 50) of the portable device 40 in accordance with the command of the control program.

The portable device 40 includes an RF antenna 48a and an LF antenna 50a. The RF antenna 48a is connected to the RF circuit 48 and the LF antenna 50a is connected to the LF circuit 50. The LF circuit 50 has a function of receiving the request signal from the vehicle 10 (the transmitting antennas 14) via the LF antenna 50a and demodulating the request signal. The RF circuit 48 has a function of transmitting the answer signal via the RF antenna 48a.

For example, a plurality of the portable devices 40 may be prepared for one vehicle 10. Therefore, each unique ID code can be assigned to each portable device 40. The unique ID code is written in advance in the EEPROM 44. Therefore, the unique ID code corresponds to the ID code written in the EEPROM 24 of the vehicle. The control IC 42 modulates the ID code read from the EEPROM 44 and outputs the modulated signal to the RF circuit 48. Through the communication between the portable device 40 and the control module 20 of the vehicle, the CPU 22 of the control module 20 can perform the authentication of the portable 40 by including the ID codes in the signal. Therefore, the portable device 40 can be distinguished individually.

The LF circuit 50 receives the request signal transmitted from the transmitting antenna 14 of the vehicle 10 via the LF antenna 50a, as described above. The request signal has a different code for each location where each transmitting antenna 14 is installed. Therefore, the LF circuit 50 demodulates the code contained in the request signal and supplies the demodulated code to the control IC 42. At this time, the control IC 42 can specify the transmitting antenna 14 (in particular, the location thereof) transmitting the request signal on the basis of the received code.

The RF circuit 48 transmits the information of the transmitting antenna 14 distinguished by the control IC 42 as the answer signal. The control module 20 (the CPU 22) of the vehicle determines the individual unit (arrangement) of the transmitting antenna 14 through which the portable device 40 receives the request signal. Alternatively, when the transmitting antennas 14 transmit the request signals at a certain time interval and the portable device 40 receives the request signal and immediately replies with the answer signal, the portable device 40 can determine the individual unit (arrangement) of the transmitting antenna 14 through which the portable device 40 receives the request signal at the reception time.

The portable device 40 has, for example, an LED (Light Emitting Diode) 52 for an operation monitor. For example, when the battery 46 is used up or the RF circuit 48 and the LF circuit 50 perform the transmission and reception, the control IC 42 performs control to light the LED 52. The LED 52 may be connected to the RF circuit 48 and the LF circuit 50.

In this embodiment, the control module 20 is connected to another control unit 60 (ECU (Engine Control Unit)). The control unit 60 serves as a microcomputer (not shown) that includes a CPU, an EEPROM, a ROM, and an I/O unit. The control unit 60 controls the locking or unlocking of doors in cooperation with the control module 20 or controls the operation (for example, engine startup) of the vehicle 10. For example, a lock actuator 62 or a door closing switch (not shown) is connected to the control unit 60. Moreover, an ignition switch, an engine starter, and the like are connected to the control unit 60. Since a response operation (blinking of a hazard indicator or occurrence of an operation sound) to the vehicle 10 is performed with the operation of the keyless entry device, a turn-signal lamp, an indoor lamp, and a speaker lamp (none of which is shown) of the vehicle 10, for example, may be connected to the control unit 60.

The lock actuator 62 is, for example, a motor or a solenoid that activates a door locking or unlocking mechanism of the vehicle 10. The control unit 60 activates the lock actuator 62 when a door handle or a lock pin (not shown) in the vehicle is operated. Moreover, the control unit 60 also performs control to activate the lock actuator 62 when receiving a keyless entry signal from the control module 20 of the keyless entry device.

Control Logic

Figure 3:
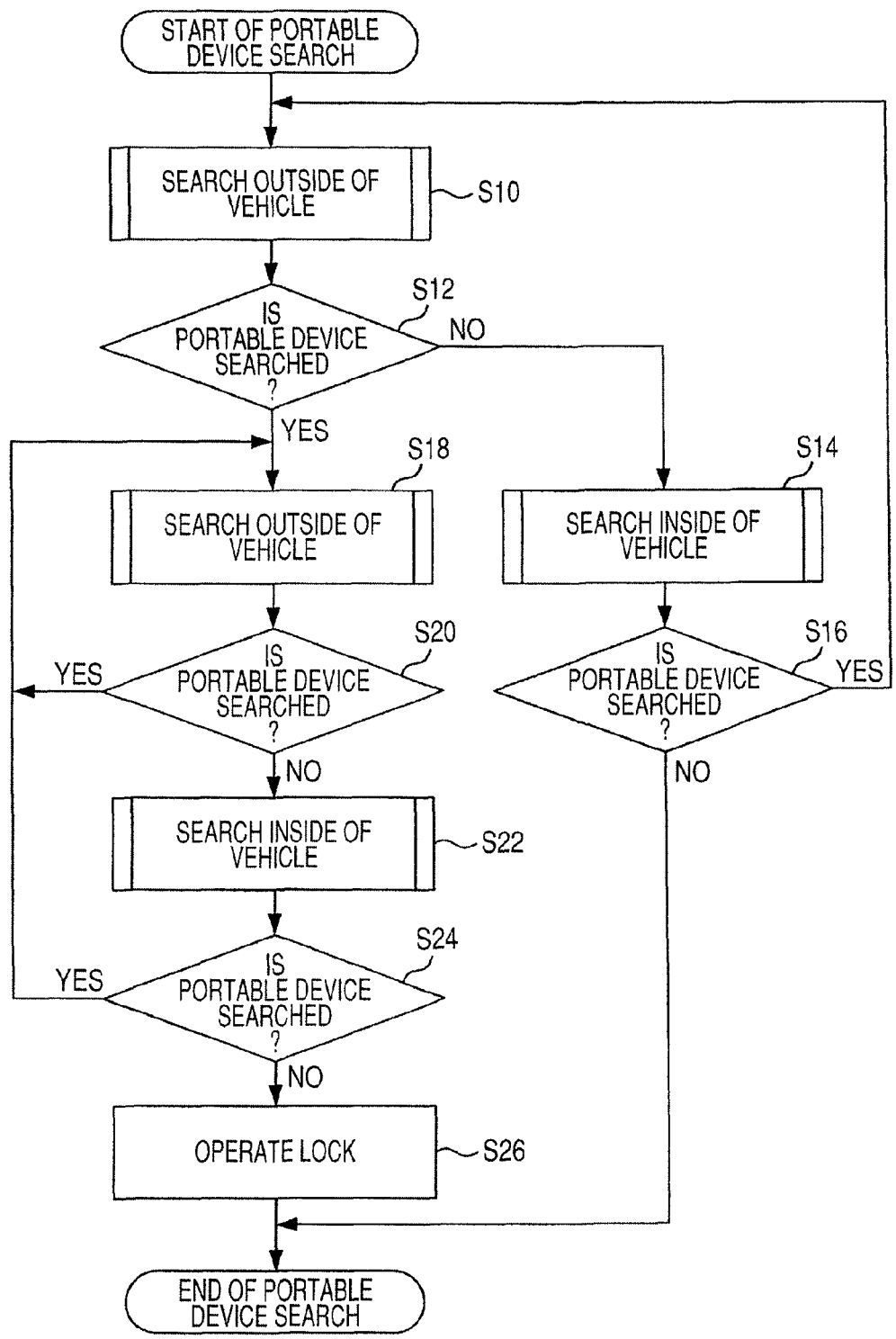
FIG. 3 is a flowchart illustrating an example of a portable searching process performed when controlling door locking.

FIG. 3 is a flowchart illustrating an example of a portable device searching process performed in the controlling of the locking of the door by the keyless entry device. The CPU 22 of the control module 20 calls the control program from the internal ROM 22a and executes the control program when the ignition switch switches from ON to OFF, for example. When a trigger event occurs, the CPU 22 starts searching for the portable device 40 and executes the process in accordance with the following sequence.

In step S10, the CPU 22 first searches for the portable device 40 within a vicinity area (a range in which the LF signal extends outside the vehicle 10) outside the vehicle. For example, the CPU 22 activates the transmitting circuit 32 and transmits the request signal via the transmitting antenna 14 (for example, the transmitting antenna located in a right or left door or a rear shelf tray) disposed to correspond to the vicinity area outside the vehicle.

In step S12, when the transmitting process ends, the CPU 22 determines whether the portable device 40 is detected in the vicinity area outside the vehicle, that is, whether the portable device 40 is present in the vicinity area outside the vehicle (first procedure). When the CPU 22 determines that the portable device 40 is not present in the vicinity area outside the vehicle (No determination), the CPU 22 proceeds to step S14.

In step S14, the CPU 22 subsequently searches for the portable device 40 inside the vehicle. For example, the CPU 22 activates the transmitting circuit 32 and transmits the request signal via the transmitting antenna 14 (for example, the transmitting antenna located in the roof) disposed so as to be used only in the vehicle.

In step S16, when the transmitting process ends, the CPU 22 determines whether the portable device 40 is detected inside the vehicle, that is, whether the portable device 40 is present inside the vehicle (second procedure). When the CPU 22 determines that the portable device 40 is present (Yes determination), the CPU 22 returns the process to step S10 and repeats the same process.

Alternatively, when the CPU 22 determines that the portable device 40 is not present inside the vehicle in step S16 (No determination), the CPU 22 terminates the search (the determination of whether the portable device is present inside the vehicle or in the vicinity area outside the vehicle) for the portable device 40. In this case, the locking of the door by the keyless entry device is not performed.

Alternatively, when the CPU 22 determines that the portable device 40 is present in the vicinity area outside the vehicle in step S12 (Yes determination), the CPU 22 proceeds to step S18.

In step S18, the CPU 22 continuously searches for the portable device 40 in the vicinity area outside the vehicle. The details of this process are the same as step S10.

In step S20, the CPU 22 determines whether the portable device 40 is present in the vicinity area outside the vehicle (third procedure). When the CPU 22 determines that the portable device 40 is present in the vicinity area outside the vehicle (Yes determination), the CPU 22 returns the process to step S18 and repeats the process. Alternatively, when the CPU 22 determines that the portable device 40 is not present in the vicinity area outside the vehicle (No determination), the CPU 22 proceeds to step S22.

In step S22, the CPU 22 searches for the portable device 40 inside the vehicle. The details of this process are the same as step S14.

In step S24, when the above process ends, the CPU 22 determines whether the portable device 40 is present inside the vehicle (fourth procedure). When the CPU 22 determines that the portable device 40 is present (Yes determination), the CPU 22 returns the process to step S18 and repeats the same process. Alternatively, when the CPU 22 determines that the portable device 40 is not present (No determination), the CPU 22 proceeds to step S26.

In step S26, the CPU 22 executes a door locking process. Specifically, the control module 20 executes a process of outputting a door locking signal to the control unit 60. Then, the control unit 60 drives the lock actuator 62 and performs control to operate the door locking mechanism. In effect, the door locking mechanism is operated when the other condition (detection of door closure) is finally satisfied. When the door is open, the door locking mechanism cannot be operated.

When the process is performed in accordance with the above sequence, the CPU 22 terminates the process of searching for the portable device 40.

Operation Example

An operation example when the keyless entry device according to this embodiment performs the control logic will be described.

FIG. 4 is a diagram conceptually illustrating the status changes when the driver carrying the portable device 40 is getting off the vehicle 10 and walking away from the vehicle and determination results of the searching process performed during the status changes. In FIG. 4, the reference numerals in the drawings are omitted to facilitate illustration, but the reference numerals are used in the description of the operation example. Boundary lines indicated by a long chain line of FIG. 4 show the range in which the request signal reaches in the vicinity area outside the vehicle. The portable device 40 is indicated by a simple symbol (indicated by a hatched oval) in FIG. 4.

Occurrence of Trigger

In part (A) of FIG. 4, for example, when the ignition switch of the vehicle 10 switches from ON to OFF, the portable device searching process (FIG. 3) is initiated as the trigger event.

In the process of searching the portable device, according to the control logic, the portable device 40 is first searched for in the vicinity area outside the vehicle (step S10). At this time, since the portable device 40 (indicated by the oval symbol) is present together with the driver, it is determined that the portable device 40 is not present in the vicinity area outside the vehicle (confirmation of the outside of the vehicle=No).

Subsequently, according to the control logic, the portable device 40 is searched for inside the vehicle (step S14). At this time, it is determined that the portable device 40 is present inside the vehicle (confirmation of the inside of the vehicle=Yes). Subsequently, search for the portable device 40 is continued in the vicinity area outside the vehicle (step S16→step S10). However, while the portable device 40 is continuously located in the vehicle, the same determination result is obtained (confirmation of the outside of the vehicle=No→confirmation of the inside of the vehicle=Yes).

While Getting Off

In part (B) of FIG. 4, subsequently, it is assumed that the driver carrying the portable device 40 is getting off after opening the door. At this time, according to the control logic, the portable device 40 is first searched for in the vicinity area outside the vehicle. When the driver is getting off, it is determined that the portable device 40 is present in the vicinity area outside the vehicle (the confirmation of the outside of the vehicle=Yes).

When the driver is very rapidly getting off, it can be considered that the searching process (step S10) is not matched with the time of getting off the vehicle by the relationship with the processing time of the CPU 22. In this case, since the searching chance is missed, the determination result cannot be obtained naturally (FAIL).

After Getting Off

The circumstance where the driver got off can be broadly divided into two patterns, for example. One pattern is a 1st pattern in which the driver having gotten off the vehicle is present together with the portable device 40 in the vicinity area outside the vehicle (part (C1) of FIG. 4). The other pattern is a 2nd pattern in which the driver having gotten off the vehicle is present together with the portable device 40 in the vicinity area outside the vehicle and the door is still being opened (parts (C2) and (C3) of FIG. 4).

In the 1st pattern, it can be considered that the driver carrying the portable device 40 is located out of the vicinity area outside the vehicle as the status change, for example (part (D1) of FIG. 4). In the second pattern, the following two patterns can be considered as the status change.

One pattern is a 2nd-1 pattern in which the driver carrying the portable device 40 is located out of the vicinity area outside the vehicle and the door has already been closed (part (D2) of FIG. 4). The other pattern is a 2nd-2 pattern in which the driver carrying the portable device 40 is located out of the vicinity area outside the vehicle but the door is still being opened (part (D3) of FIG. 4). In the 2nd-2 pattern, the following pattern can be considered as the status change.

That is, the driver carrying the portable device 40 is located out of the vicinity area outside the vehicle but a passenger has closed the door (part (E) of FIG. 4). Hereinafter, the patterns will be described in more detail.

1st Pattern after Getting Off

In part (C1) of FIG. 4, since the driver having gotten off the vehicle is present together with the portable device 40 in the vicinity area outside the vehicle and the door has been closed, the portable device 40 is first searched for in the vicinity area outside the vehicle according to the control logic (step S10). As a consequence, it is determined that the portable device 40 is present in the vicinity area outside the vehicle (the confirmation of the outside of the vehicle=Yes).

In part (D1) of FIG. 4, subsequently, even when the driver carrying the portable device 40 is located out of the vicinity area outside the vehicle, the portable device 40 is first searched for in the vicinity area outside the vehicle according to the control logic (step S18). In this case, since it is determined that the portable device 40 is not present in the vicinity area outside the vehicle (the confirmation of the outside of the vehicle=No), the portable device 40 is subsequently searched for inside the vehicle according to the control logic (step S22). However, since the portable device 40 has been moved out of the vehicle, it is naturally determined that the portable device 40 is not present inside the vehicle (the confirmation of the inside of the vehicle=No).

Locking of Door

In part (E) of FIG. 4, since it is finally determined that the driver carrying the portable device 40 is located out of the vicinity area outside the vehicle, the locking of the door can be performed according to the control logic (step S26).

2nd-1 Pattern after Getting Off

In part (C2) of FIG. 4, when the driver having gotten off the vehicle is present together with the portable device 40 and the door is still being opened, the portable device 40 is first searched for in the vicinity area outside the vehicle according to the control logic (step S10). As a consequence, it is determined that the portable device 40 is present in the vicinity area outside the vehicle (the confirmation of the outside of the vehicle=Yes).

In part (D2) of FIG. 4, subsequently, when the driver carrying the portable device 40 is located out of the vicinity area outside the vehicle and the door has been closed, the portable device 40 is first searched for in the vicinity area outside the vehicle according to the control logic (step S18). In this case, since it is determined that the portable device 40 is not present in the vicinity area outside the vehicle (the confirmation of the outside of the vehicle=No), the portable device 40 is subsequently searched for inside the vehicle according to the control logic (step S22). However, since the portable device 40 has already been moved out of the vehicle, it is naturally determined that the portable device 40 is not present inside the vehicle (the confirmation of the inside of the vehicle=No).

Locking of Door

In (E) of FIG. 4, since it is finally determined that the driver (or another related person or the like) has closed the door and then that the driver carrying the portable device 40 is located out of the vicinity area outside the vehicle, the locking of the door can be performed according to the control logic (step S26).

2nd-2 Pattern after Getting Off

In part (C3) of FIG. 4, similarly, when the driver having gotten off the vehicle is present together with the portable device 40 and the door is still being opened, the portable device 40 is first searched for in the vicinity area outside the vehicle according to the control logic (step S10). As a consequence, it is determined that the portable device 40 is present in the vicinity area outside the vehicle (the confirmation of the outside of the vehicle=Yes).

In part (D3) of FIG. 4, subsequently, when the driver carrying the portable device 40 is located out of the vicinity area outside the vehicle and the door is still being opened, the portable device 40 is first searched for in the vicinity area outside the vehicle according to the control logic (step S18). In this case, since it is determined that the portable device 40 is not present in the vicinity area outside the vehicle (the confirmation of the outside of the vehicle=No), the portable device 40 is subsequently searched for inside the vehicle according to the control logic (step S22). However, since the portable device 40 has already been moved out of the vehicle in spite of the fact that the door is being opened, it is naturally determined that the portable device 40 is not present inside the vehicle (the confirmation of the inside of the vehicle=No).

Locking of Door

In part (E) of FIG. 4, since it is finally determined that another person or the like other than the driver has closed the door and then that the driver carrying the portable device 40 is located out of the vicinity area outside the vehicle, the locking of the door can be'performed according to the control logic (step S26).

According to this embodiment, since the portable device 40 is first searched for in the vicinity area outside the vehicle, as described above, the following advantages can be obtained.

For example, even when the driver carrying the portable device 40 has gotten off the vehicle and has walked at a very fast speed (a speed much faster than a normal walking speed) out of the vicinity area outside the vehicle, the portable device 40 is searched for at least once at a certain time at which the driver is getting off and walking out. Therefore, it is determined at least once that the portable device 40 is present in the vicinity area outside the vehicle. Even when it is determined that the portable device 40 is not present in the vicinity area outside the vehicle, it can finally be determined that the driver is located out of the vicinity area outside the vehicle, thereby performing the locking of the door.

On the other hand, the driver may be moving fast, as in part (B) of FIG. 4, and thus the searching chance is missed at the timing at which the driver is getting off. Even in this case, by continuously searching for the portable device 40 first in the vicinity area outside the vehicle, the determination is achieved once when the portable device 40 is present in the vicinity area outside the vehicle (parts (C1) to (C3) of FIG. 4). Accordingly, when it is determined that the portable device 40 is not present in the vicinity area outside the vehicle, it can finally be determined that the driver is located out of the vicinity area outside the vehicle, thereby performing the locking of the door.

The advantages of the above-described embodiment in terms of the control logic will be described in the following comparative example.

COMPARATIVE EXAMPLE

In a comparative example of the above-described embodiment, a method of first searching the inside of the vehicle is used in accordance with general control logic.

FIG. 5 is a diagram conceptually illustrating the status changes and determination results of the searching process performed during the status changes according to the comparative example. Since the status changes shown in parts (A) to (E) of FIG. 5 are the same as those described according to the above example, the repeated description is omitted.

In FIG. 5, two methods of two upper and lower stages are shown as the determination results according to the comparative example. The determination results in the upper stage show cases where the search chance is not missed at a midway timing. Alternatively, the determination results in the lower stage show cases where the search chance is missed at the midway timing. First, the determination results in the upper stage will be described.

Case where Search Chance is not Missed

In part (A) of FIG. 5, for example, when the ignition switch of the vehicle 10 switches from ON to OFF, the portable device 40 is first searched for inside the vehicle according to the control logic according to the comparative example. At this time, since the driver carrying the portable device 40 is present inside the vehicle, it is determined that the portable device 40 is present inside the vehicle (the confirmation of the inside of the vehicle=Yes). When it can be determined that the portable device 40 is present inside the vehicle in the comparative example, it is not necessary to search for the portable device any more. Therefore, the vicinity area outside the vehicle is not searched typically.

In part (B) of FIG. 5, when the driver carrying the portable device 40 is opening a door and getting off, the portable device 40 is first searched for in the vicinity area outside the vehicle according to the control logic of the comparative example. Therefore, it is determined that the portable device 40 is not present inside the vehicle (the confirmation of the inside of the vehicle=No).

In parts (C1) to (C3) of FIG. 5, when it is determined that the portable device 40 is not present inside the vehicle, the vicinity area outside the vehicle is searched last according to the control logic of the comparative example. As a result, it is determined that the portable device 40 is present for the first time in the vicinity area outside the vehicle (the confirmation of the outside of the vehicle=Yes).

In parts (D1) to (D3) of FIG. 5, when the driver carrying the portable device 40 has moved out of the vicinity area outside the vehicle, it is determined that the portable device 40 is not present in the vicinity area outside the vehicle according to the control logic of the comparative example (the confirmation of the outside the vehicle=No).

In part (E) of FIG. 5, since it is consequently determined that the driver carrying the portable device 40 is located out of the vicinity area outside the vehicle, the locking of the door can be operated as in the embodiment.

On the contrary, when the search chance is missed at the midway timing (in particular, part (B) of FIG. 5) in the comparative example, the search results are as follows.

Case where Search Chance is Missed

In part (A) of FIG. 5, when the driver carrying the portable device 40 is present inside the vehicle at the time at which the ignition switch of the vehicle 10 switches from ON to OFF, it is determined that the portable device 40 is present in the vehicle (the confirmation of the inside of the vehicle=Yes).

In part (B) of FIG. 5, subsequently, when the driver carrying the portable device 40 has gotten off the vehicle fast, the portable device is not searched for at the timing at which the driver is getting off and thus the search chance inside the vehicle may be missed. In this case, only the status change occurs without searching for the portable device 40 (FAIL in the lower stage).

In parts (C1) to (C3) of FIG. 5, the search chance is missed at the previous timing, but the portable device is searched for inside the vehicle at the next timing at which the status change occurs. At this time, however, since the driver carrying the portable device 40 has moved to the vicinity area outside the vehicle, it is determined that the portable device 40 is not present inside the vehicle (the confirmation of the inside of the vehicle=No). Before the present time, the presence of the portable device 40 has not been confirmed once.

In parts (D1) to (D3) of FIG. 5, subsequently, when the driver carrying the portable device 40 is located out of the vicinity area outside the vehicle, it is also determined that the portable device 40 is not present in the vicinity area outside the vehicle (the confirmation of the inside of the vehicle=No).

In part (E) of FIG. 5, consequently, it is determined that the portable device 40 is not present either inside the vehicle or in the vicinity area outside the vehicle without confirming the presence of the portable device 40 once in the comparative example. Therefore, since the location of the portable device 40 is lost (missing search) in the control, the locking of the door cannot be performed on the basis of a reliable determination.

New Problems

Of course, when the location of the portable device 40 is lost in the comparative example, it can be supposed that the driver carrying the portable device 40 is finally located out of the vicinity area outside the vehicle and thus the locking of the door can be performed. In this case, however, the following problems may arise.

That is, it may be determined that the portable device 40 is not present inside the vehicle due to communication failure or reduction in battery capacity, even when the portable device 40 is actually present inside the vehicle. Consequently, it may be determined that the portable device 40 is not present either inside the vehicle or in the vicinity area outside the vehicle in the control, as in the case where the search chance is missed at the midway timing. In this case, when the driver has gotten off and closed the door with the portable device 40 left inside the vehicle, the locking of the door is performed on the basis of the above assumption. Therefore, the portable device 40 is left inside the vehicle.

Even when the communication status is recovered with the portable device 40 left inside the vehicle, the door cannot be unlocked from the outside without using the key. Therefore, it is not easy to recover the portable device 40. It is widely considered that the driver often using the keyless entry device carries no key. Then, when the driver returns to the vehicle 10, the driver may be unable to get in the vehicle due to the fact that the door is locked.

In the embodiment, since the control logic is used so as to first search the vicinity area outside the vehicle, it can be determined at least once that the portable device 40 is present in the vicinity area outside the vehicle even in the case where the search chance is missed at the midway timing, as described above. In this way, since the locking of the door can be performed from the status change according to the clear basis, the safety can be ensured without deteriorating convenience.

The invention is not limited to the above-described embodiment, but may be modified in various forms. In the above-described embodiment, it is assumed that the driver carrying the portable device 40 is moving out of the vicinity area outside the vehicle. However, the control logic according to the embodiment is applicable to a case where another related person (passenger or the like) carrying the portable device 40 is moving.

In the above-described embodiment, the hardware configuration where the control module 20 and the control unit 60 are separated from each other has been exemplified, but these functions may be realized in one integrated hardware unit.

It should be understood by those skilled in the art that various modifications, combinations, sub-combinations and alternations may occur depending on design requirements and other factors insofar as they are within the scope of the appended claims of the equipment thereof.

What is claimed is:

1. A keyless entry device of a vehicle comprising:
   transmission means installed in the vehicle for transmitting a search signal to a search range including an area inside the vehicle and a vicinity area outside the vehicle;
   reply means installed in a portable device carried by a user for transmitting a reply signal when receiving the search signal at several locations within the search range;
   determination means for individually determining whether the portable device is present in the area inside the vehicle and the vicinity area outside the vehicle within the search range on the basis of the reply signal transmitted from the portable device; and control means for controlling locking or unlocking of a door of the vehicle on the basis of the determination result of the determination means, wherein upon controlling the locking of the door, the control means changes a status of the door from an unlocked status to a locked status under a condition that the determination means determines that the portable device is present in the vicinity area outside the vehicle at least once, and wherein the determination means, as a first procedure, determines whether the portable device is present in the vicinity area outside the vehicle when the transmitting means transmits the search signal, wherein the determination means, as a second procedure, determines whether the portable device is present inside the vehicle when the determination means determines that the portable device is not present in the vicinity area outside the vehicle, wherein the determination means, as a third procedure, determines whether the portable device is present in the vicinity area outside the vehicle, when the determination means determines that the portable device is present in the vicinity area outside the vehicle in the first procedure, wherein the determination means, as a fourth procedure, determines whether the portable device is present inside the vehicle, when the determination means determines that the portable device is not present in the vicinity area outside the vehicle, and wherein the control means performs control to switch a status of the door from an unlocked status to a locked status, when the determination means determines that the portable device is not present inside the vehicle in the fourth procedure.

2. The keyless entry device of the vehicle according to claim 1, wherein the determination means repeatedly performs the determination of the first procedure when the determination means determines that the portable device is present inside the vehicle in the second procedure, and the determination means alternatively terminates the determination when the determination means determines that the portable device is not present inside the vehicle in the second procedure, and wherein the control means does not perform the control to switch the status of the door from the unlocked status to the locked status, when the determination means terminates the determination without determining that the portable device is present inside the vehicle in the second procedure.

3. The keyless entry device of the vehicle according to claim 1, wherein the determination means, as the third procedure, continuously determines whether the portable device is present in the vicinity area outside the vehicle, when the determination means determines that the portable device is present inside the vehicle in the fourth procedure.

4. The keyless entry device of the vehicle according to claim 1, wherein the transmitting means includes transmitting antennas to transmit the search signal toward the area inside the vehicle and the vicinity area outside the vehicle, respectively, wherein the determination means determines whether the portable device is present inside the vehicle, when the search signal is transmitted toward the inside of the vehicle via the transmitting antenna, and the determination means determines whether the portable device is present in the vicinity area outside the vehicle, when the search signal is transmitted toward the vicinity area outside the vehicle via the transmitting antenna.

5. A keyless entry device of a vehicle comprising:

a transmission unit installed in the vehicle that transmits a search signal to a search range including an area inside the vehicle and a vicinity area outside the vehicle;

a reply unit installed in a portable device carried by a user that transmits a reply signal when receiving the search signal at several locations within the search range;

a determination unit that individually determines whether the portable device is present in the area inside the vehicle and the vicinity area outside the vehicle within the search range on the basis of the reply signal transmitted from the portable device; and a control unit that controls locking or unlocking of a door of the vehicle on the basis of the determination result of the determination unit, wherein upon control of the locking of the door, the control unit changes a status of the door from an unlocked status to a locked status under a condition that the determination unit determines that the portable device is present in the vicinity area outside the vehicle at least once.

* * * * *